(12) United States Patent
Kwon et al.

(10) Patent No.: US 9,214,684 B2
(45) Date of Patent: Dec. 15, 2015

(54) FUEL CONTROL SYSTEM AND METHOD FOR FUEL CELL SYSTEM

(75) Inventors: Bu Kil Kwon, Gyeonggi-do (KR); Hyun Joon Lee, Gyeonggi-do (KR); Ho June Bae, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 480 days.

(21) Appl. No.: 13/164,042

(22) Filed: Jun. 20, 2011

(65) Prior Publication Data

US 2012/0141891 A1 Jun. 7, 2012

(30) Foreign Application Priority Data

Dec. 3, 2010 (KR) .................. 10-2010-0122387

(51) Int. Cl.
*H01M 8/04* (2006.01)

(52) U.S. Cl.
CPC ...... *H01M 8/04097* (2013.01); *H01M 2250/20* (2013.01); *Y02E 60/50* (2013.01); *Y02T 90/32* (2013.01)

(58) Field of Classification Search
CPC ............. H01M 8/04097; H01M 2250/20; Y02E 60/50
USPC ............ 429/415, 400; 29/284, 650; 194/265, 194/247; 165/123, 120
See application file for complete search history.

(56) References Cited

U.S. PATENT DOCUMENTS

| 6,508,416 | B1 * | 1/2003 | Mastro et al. ............. 239/585.1 |
| 7,320,840 | B2 * | 1/2008 | Pechtold et al. ............. 429/446 |
| 7,718,287 | B2 | 5/2010 | Sparschuh et al. |
| 2004/0166384 | A1 | 8/2004 | Schafer |
| 2006/0024548 | A1 * | 2/2006 | Pechtold et al. ............. 429/34 |
| 2007/0248858 | A1 * | 10/2007 | Blaszczyk et al. ............. 429/25 |
| 2008/0138689 | A1 | 6/2008 | Leo et al. |
| 2009/0155641 | A1 * | 6/2009 | Senner et al. ............. 429/17 |
| 2009/0155668 | A1 * | 6/2009 | Ban et al. ............. 429/34 |
| 2009/0233132 | A1 * | 9/2009 | Hasuka et al. ............. 429/25 |

FOREIGN PATENT DOCUMENTS

| JP | 2003-317758 | * | 11/2003 | ............. H01M 8/10 |
| JP | 2004-146098 | A | 5/2004 | |
| JP | 2006-164731 | A | 6/2006 | |
| JP | 2008-053151 | A | 3/2008 | |
| JP | 2008-071734 | A | 3/2008 | |
| JP | 2008-112585 | * | 5/2008 | ............. H01M 8/04 |
| JP | 2008112585 | A | 5/2008 | |

(Continued)

*Primary Examiner* — Patrick Ryan
*Assistant Examiner* — Aaron Greso
(74) *Attorney, Agent, or Firm* — Mintz Levin Cohn Ferris Glovsky and Popeo, P.C.; Peter F. Corless (57) ABSTRACT

The present invention provides a fuel control system and method, e.g., for a vehicle fuel cell system, which can efficiently supply hydrogen to a fuel cell stack and increase the efficiency of an ejector. For this purpose, the present invention provides a fuel control system having a series-connected multi-stage pressure control structure, in which an additional injector is provided in series between an injector for controlling the pressure of hydrogen supplied, a pressure control valve, or a pressure control actuator and a hydrogen recirculation ejector in a hydrogen supply passage, through which hydrogen is supplied from a hydrogen supply unit to a fuel cell stack, such that the pressure of hydrogen supplied is controlled in stages.

12 Claims, 5 Drawing Sheets

(56) References Cited

FOREIGN PATENT DOCUMENTS

| JP | 2008-198406 A | 8/2008 | | |
|----|---|---|---|---|
| JP | 2008190336 A | 8/2008 | | |
| JP | 2008196401 A | 8/2008 | | |
| JP | 2008-235020 A | 10/2008 | | |
| JP | 2009-252634 A | 10/2009 | | |
| JP | 2009252634 A | 10/2009 | | |
| KR | 10-2009-0062699 A | 6/2009 | | |
| WO | WO 2007/069472 | * | 6/2007 | .............. H01M 8/00 |

* cited by examiner

FUEL CONTROL SYSTEM AND METHOD FOR FUEL CELL SYSTEM

CROSS-REFERENCE TO RELATED APPLICATION

This application claims under 35 U.S.C. §119(a) the benefit of Korean Patent Application No. 10-2010-0122387 filed Dec. 3, 2010, the entire contents of which are incorporated herein by reference.

BACKGROUND (a) Technical Field

The present disclosure relates to a fuel control system and method for a fuel cell system. More particularly, it relates to a fuel control system and method for a vehicle fuel cell system, which can efficiently supply hydrogen to a fuel cell stack and increase the efficiency of an ejector.

(b) Background Art

A fuel cell system, which may be applied to a hydrogen fuel cell vehicle as an environmentally-friendly vehicle, generally comprises a fuel cell stack for generating electricity by an electrochemical reaction between reactant gases, a hydrogen supply system for supplying hydrogen as a fuel to the fuel cell stack, an air supply system for supplying oxygen containing air as an oxidant required for the electrochemical reaction in the fuel cell stack, and a thermal management system for removing reaction heat from the fuel cell stack to the outside of the fuel cell system, controlling operation temperature of the fuel cell stack, and performing water management function.

The hydrogen supply system comprises a hydrogen supply unit (e.g., a hydrogen tank) from which hydrogen as a fuel is supplied to the fuel cell stack, a hydrogen supply valve (e.g., a start/stop solenoid valve) for supplying and cutting off the hydrogen from the hydrogen supply unit, a pressure regulator for regulating the pressure of hydrogen supplied, and a hydrogen recirculation system for recirculating unreacted hydrogen discharged from an anode outlet of the fuel cell stack to an anode inlet.

The hydrogen recirculation system may be configured with only an ejector or with both an ejector and a hydrogen recirculation blower. When the hydrogen is recirculated and reused (with the hydrogen recirculation blower), the distribution of reactants in the fuel cell stack becomes uniform due to an increase in the flow rate of hydrogen in the fuel cell stack, and thus a uniform cell voltage distribution can be obtained, which allows the fuel cell stack to operate more stably.

The method of using the hydrogen recirculation blower, however, has various problems. For example, it has a complicated structure, requires lubrication, and generates noise and vibration. Therefore, various techniques for recirculating hydrogen using the ejector without a hydrogen recirculation blower have been proposed.

Figure 4:
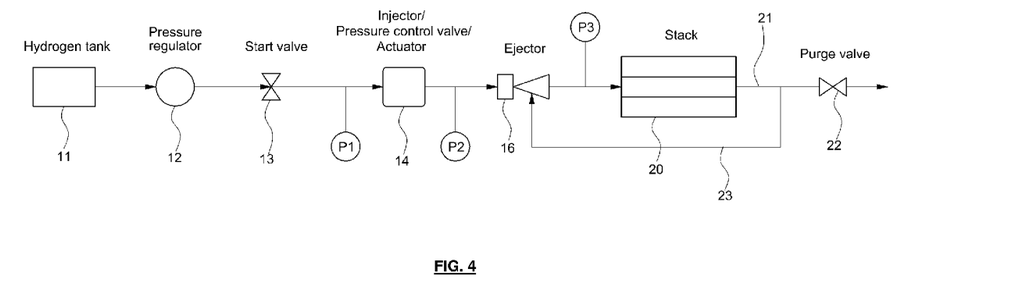
FIG. 4 is a diagram showing an example of the configuration of a hydrogen supply system.

FIG. 4 is a diagram showing an example of the configuration of a hydrogen supply system in a vehicle fuel cell system, in which an ejector is used for hydrogen recirculation.

In the above hydrogen supply system, a typical hydrogen tank 11 as a hydrogen supply unit stores high-pressure hydrogen and supplies the high-pressure hydrogen to a fuel cell stack 20, and the high-pressure hydrogen supplied from the hydrogen tank 11 passes through a pressure regulator 12, a hydrogen supply valve 13 (e.g., a start valve), and an injector, a pressure control valve (e.g., a solenoid valve), or a pressure control actuator 14.

At this time, the pressure of the high-pressure hydrogen supplied from the hydrogen tank 11 is reduced to pressure P1 by the pressure regulator 12, regulated again to pressure P2 by the injector/pressure control valve/pressure control actuator 14, and is then supplied to the fuel cell stack 20 together with the recirculation gas sucked by an ejector 16.

In FIG. 4, the pressure of hydrogen (e.g., a mixture of fresh hydrogen and recirculation gas) supplied through the ejector 16 is shown by P3.

Moreover, a purge valve 22 for removing impurities from an anode of the fuel cell stack 20 is provided in an anode exhaust line 21 of the fuel cell stack 20.

Pressure P1 regulated by the pressure regulator 12 is always maintained constant. At pressure P1, hydrogen in an amount that can be used over the entire output range of the fuel cell vehicle should be supplied to the fuel cell stack 20, and thus a relatively high-pressure is required.

The ejector 16 serves to supply hydrogen at low pressure P3 to the fuel cell stack 20 and to suck and recirculate the unreacted hydrogen from the anode of the fuel cell stack 20 using low pressure created by high-speed hydrogen jet while the high-pressure hydrogen passes through a nozzle (e.g., a converging nozzle or a converging-diverging nozzle).

Next, the features and drawbacks of the injector, the pressure control valve, and the pressure control actuator 14, which are disposed in front of the ejector from the hydrogen tank, will be described.

1. Injector: An injector should cover the entire output range of the fuel cell system, and thus pressure P2 should be regulated below pressure P1. While the injector has a very fast response and a long life span compared to the pressure control valve, it is difficult to develop the injector due to a large change in pressure at front and rear ends thereof. Moreover, since the amount of hydrogen supplied is controlled by high pressure P1, the frequency of operation of the injector is increased, which reduces the life span of the injector. Prior art patents related to the injector include U.S. Pat. No. 7,320,840, U.S. Patent Publication No. 2009/0155641, etc.

2. Pressure control valve: A solenoid valve using proportional control is typically used. The amount of hydrogen supplied is determined by controlling pressure P2 based on the output of the vehicle. The hydrogen supply is performed by controlling pressure P3 according to a request of a controller. Since the injector controls the hydrogen supply in an open/close manner, the hydrogen supply to the ejector is discontinuous, and thus it is inefficient for the hydrogen recirculation through the ejector. However, the pressure control valve can continuously control the hydrogen supply, and thus it can be efficiently used in the hydrogen recirculation through the ejector. Moreover, the pressure control valve should quickly control the amount of hydrogen supplied according to the rapidly changing vehicle output, but the response time is slow due to the nature of the pressure control valve. Furthermore, the pressure control valve should continuously operate according to the operating conditions of the vehicle, and thus the durability of the pressure control valve is reduced. In addition, to follow pressure P3 required by the controller, the pressure control valve should be controlled under proportional-integral-derivative (PID) control, which makes the pressure control valve operate more frequently, thereby further reducing the durability. During low output operation, a small amount of hydrogen should be supplied, and thus it is necessary to precisely control the flow rate (or pressure P2) of hydrogen. However, a large amount of hydrogen flows due to high pressure P1, even when the pressure control valve is minimally opened, and thus it is not easy to control the pressure control valve. Especially, to allow the pressure control valve to maintain airtightness, the pressure control valve should be pressed with relatively strong force when it is closed. In this case, it is more difficult to precisely control the flow rate of hydrogen. Moreover, it is difficult to control the pressure control valve due to its hysteresis characteristics.

3. Actuator/motor: This is efficient for the hydrogen recirculation through the ejector. Moreover, since there is no hysteresis and location information can be accurately detected, it is easy to control the actuator. However, the actuator is disadvantageous in terms of cost and weight and in terms of durability due to the fact that a complex gear structure is included in the actuator.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention is directed to alleviating the above-described problems associated with prior art. Accordingly, the present invention provides a fuel control system and method for a fuel cell system, which can efficiently supply hydrogen to a fuel cell stack and increase the efficiency of an ejector.

In one aspect, the present invention provides a fuel control system for a vehicle fuel cell system, the fuel control system comprising a series-connected multi-stage pressure control structure, in which an additional injector is provided in series between an injector for controlling the pressure of hydrogen supplied, a pressure control valve, or a pressure control actuator and a hydrogen recirculation ejector in a hydrogen supply passage, through which hydrogen is supplied from a hydrogen supply unit to a fuel cell stack, such that the pressure of hydrogen supplied is controlled in stages.

In another aspect, the present invention provides a fuel control method for a vehicle fuel cell system, the fuel control method comprising: providing a series-connected multi-stage pressure control structure, in which an additional injector is disposed in series between an injector for controlling the pressure of hydrogen supplied, a pressure control valve, or a pressure control actuator and a hydrogen recirculation ejector in a hydrogen supply passage, through which hydrogen is supplied from a hydrogen supply unit to a fuel cell stack, such that the pressure of hydrogen supplied is controlled in stages; and controlling the injector additionally provided in the series-connected multi-stage pressure control structure such that the amount of hydrogen supplied to the ejector is maintained constant, thereby maintaining the pressure of hydrogen supplied to the fuel cell stack constant.

Other aspects and preferred embodiments of the invention are discussed herein.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

11: hydrogen tank;
12: pressure regulator;
13: hydrogen supply valve (start valve);
14 flow device (injector/pressure control valve/pressure control actuator);
15: injector;
16: ejector;
20: fuel cell stack; and
22: purge valve.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Also, it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention provides a fuel control system having a series-connected multi-stage pressure control structure, in which an injector is additionally disposed between an injector for controlling the pressure of hydrogen supplied, a pressure control valve, or a pressure control actuator and a hydrogen recirculation ejector in a fuel (hydrogen) supply passage such that the pressure of hydrogen supplied is controlled in stages.

In the fuel control system having the series-connected multi-stage pressure control structure, it is possible to efficiently supply hydrogen to the fuel cell stack and increase the efficiency of the ejector. Moreover, as will be described later, if the additional injector is periodically opened and closed, it is possible to purge an anode of a fuel cell stack by increasing and decreasing the amount of hydrogen recirculated by the ejector, and thus it is possible to minimize the number of purging operations of an anode exhaust line. Therefore, it is possible to minimize the amount of hydrogen discharged from the anode exhaust line to the outside of the fuel cell stack and thus increase fuel efficiency.

Figure 1:
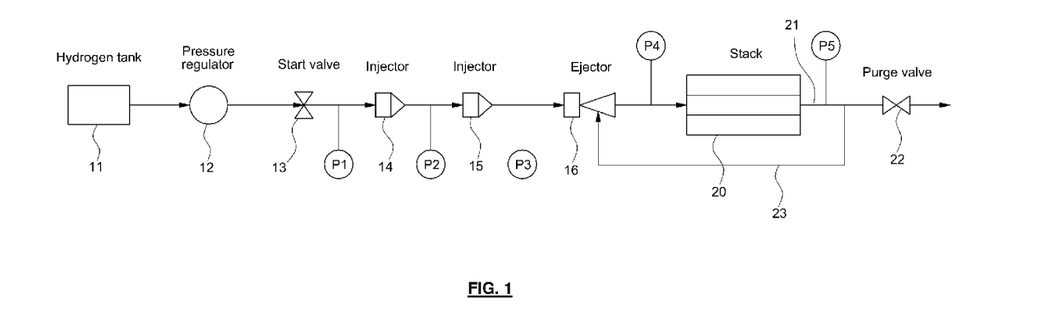
FIG. 1 is a diagram showing the configuration of a fuel control system in accordance with an example embodiment of the present invention.

FIG. 1 is a diagram showing the configuration of a fuel control system for a vehicle fuel cell system in accordance with an illustrative embodiment of the present invention, the fuel control system having a series-connected multi-stage pressure control structure in which two injectors are connected in series. As noted herein, however, the first injector 14 may alternatively be a pressure control valve or pressure control activator, and an injector, pressure control valve, and pressure control activator may be referred to generally herein as a "flow device".

The fuel control system according to the present invention has a series-connected multi-stage pressure control structure, in which an additional injector is disposed in series between an existing injector, a pressure control valve, or a pressure control actuator and a hydrogen recirculation ejector. As shown in FIG. 1, two injectors 14 and 15 may be connected in series in the series-connected multi-stage pressure control structure.

That is, the fuel control system of FIG. 1 according to this embodiment of the present invention comprises two injectors 14 and 15 connected in series.

In this configuration, the pressure of high-pressure hydrogen supplied from a hydrogen supply unit 11 (e.g., a hydrogen tank) is first controlled (reduced) by a pressure regulator 12, and the first controlled pressure becomes P1 when a hydrogen supply valve 13 (e.g., a start valve) is opened during vehicle start-up.

Pressure P1 is secondarily controlled to become pressure P2 while passing through the front injector 14, and then hydrogen is controlled to have pressure P3, a flow rate, and a duty, which can maximize the efficiency of the ejector, while passing through the rear injector 14.

Moreover, the hydrogen supplied to the ejector 16 is mixed with the recirculation gas sucked from an anode of a fuel cell stack 20, and the mixed gas at pressure P4 is finally supplied to the anode of the fuel cell stack 20.

In the above-described series-connected multi-stage pressure control structure, when the amount of hydrogen supplied is uniformly maintained and supplied, the performance (efficiency) of the ejector 16 can be maximized.

Moreover, a vehicle often requires fast response, and the hydrogen supply using the ejector can satisfy this demand. That is, it is possible to provide fast response required by the vehicle using the rear injector 15 and, when the amount of hydrogen supplied to the ejector 16 is uniformized by controlling pressure P2 to an appropriate level using the front injector 14, the efficiency of the ejector 16 can be maximized.

When the concentration of nitrogen in the anode of the fuel cell stack 20 is not high, it is possible to control pressure P3 in the form of pulses using the series-connected injectors 14 and 15, and this pulse-type control allows water accumulated in the fuel cell stack 20 to be efficiently discharged to the outside of the fuel cell stack 20.

Accordingly, the electrical output of the fuel cell stack 20 can be improved, and the number of purging operations of an anode exhaust line 21 can be minimized. As a result, it is possible to reduce the amount of hydrogen discharged through a purge valve 22 to the outside and thus increase fuel efficiency.

For reference, an electrochemical reaction of hydrogen and oxygen should occur rapidly in the fuel cell stack such that the fuel cell vehicle outputs high power. At this time, the rate of the electrochemical reaction depends on the amount of hydrogen supplied to a reaction site in the fuel cell stack, and the rapid supply of hydrogen can be achieved by increasing the amount of hydrogen recirculated.

Since the sucking force of the ejector causes the recirculation of hydrogen, the amount of hydrogen recirculated can be increased by increasing the sucking force of the ejector, which is determined by the amount (pressure) of hydrogen supplied.

When the same amount of hydrogen is supplied to the ejector, a continuous supply of a constant amount of hydrogen can increase the amount of hydrogen recirculated, compared to a discontinuous supply.

Figure 5:
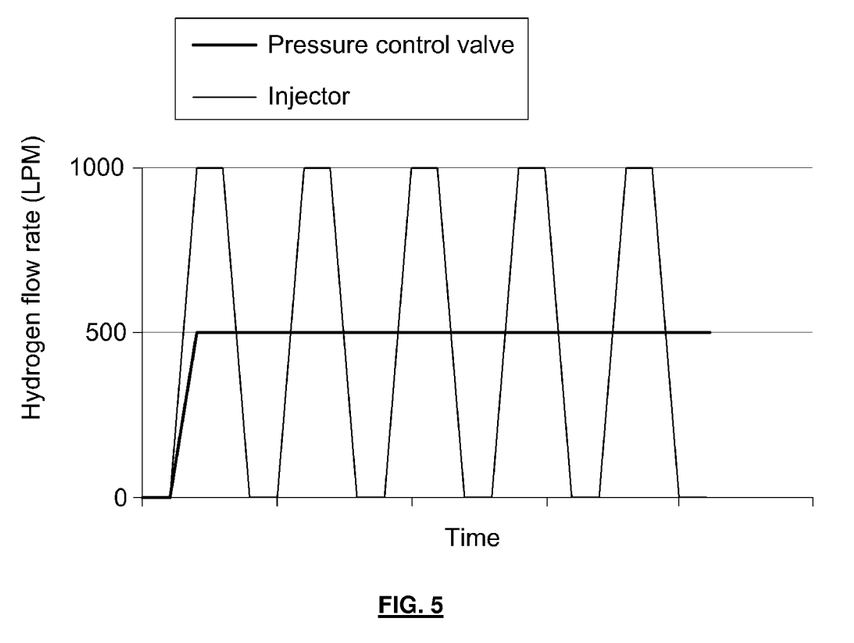
FIG. 5 is a diagram showing a method of supplying hydrogen using a pressure control valve and an injector.

For example, a method of supplying hydrogen of 500 LPM (liters per minute) in a typical vehicle fuel cell system can be simply classified into two methods such as a method of continuously supplying hydrogen of 500 LPM using a pressure control valve in FIG. 4 and a method of repeating the supply and cutoff of hydrogen of 1,000 LPM using an injector in FIG. 4 as shown in FIG. 5.

According to one or more of the embodiments herein, the utilization of the fast response of the injector and the maximization of the efficiency of the ejector can be achieved using the injectors 14 and 15 connected in series as shown in FIG. 1.

That is, the nozzle opening and closing speed of the injector 15 disposed in front of the ejector 16 is reduced such that the hydrogen supplied to the ejector 16 is almost continuously supplied, or the opening time of the rear injector 15 is increased and the closing time thereof is reduced such that the hydrogen is continuously supplied in the same manner as the pressure control valve, thereby maximizing the efficiency of the ejector 16.

To control the operation of the rear injector 15 in the above manner, pressure P2 at the front of the rear injector 15 should be within an appropriate pressure range according to the amount of hydrogen required by the vehicle.

Pressure P1 is fixed at a constant value, and thus the front injector 14 can be used to reduce pressure P1 to desired pressure P2.

The necessity of removing water from the fuel cell stack and the drawbacks caused by the purging of the existing anode exhaust line will be described below. Water as a product of the fuel cell reaction is produced in the fuel cell stack, and this product water should be smoothly discharged to the outside of the fuel cell stack.

When the water is not smoothly discharged from the fuel cell stack, it interrupts the fuel supply to deteriorate the performance of the fuel cell stack, and in severe cases, the components of the fuel cell stack may be damaged by fire.

In order to discharge water from the anode, the amount of hydrogen flowing through the fuel cell stack is generally increased to increase the flow rate of fluid (e.g., a mixed gas containing water) in the fuel cell stack.

For this purpose, periodic purging of fuel is most widely used. That is, the purge valve 22 is provided in the recirculation passage or at the anode of the fuel cell stack and opened to temporarily increase the amount of hydrogen flowing through the fuel cell stack 20, thus removing water from the fuel cell stack 20.

The purposes of the periodic purging are to discharge water from the fuel cell stack as well as to reduce the concentration of nitrogen fed to the anode. Of course, during vehicle start-up, the concentration of nitrogen in the anode is very high, and in this case, the primary purpose of the purging is to reduce the concentration of nitrogen in the anode.

However, during the purging, the hydrogen is discharged to the outside, which reduces fuel efficiency and causes risk factors due to the discharge of hydrogen to the outside (thus, dilution is required).

In the configuration of the present invention shown in FIG. 1, the water can be removed from the anode of the fuel cell stack using the injector 15. That is, the amount of hydrogen flowing through the fuel cell stack (i.e., the amount of hydrogen recirculated) is temporarily increased, and thus the water can be removed from the anode of the fuel cell stack.

After the removal of water, pressure P4 is controlled to be constant based on the output of the vehicle. That is, the amount of hydrogen supplied is controlled to be constant according to the output of the vehicle.

To remove water from the fuel cell stack, the rear injector 15 is periodically opened and closed to increase or decrease the amount of hydrogen supplied to the ejector 16 in the form of pulses. When the amount of hydrogen recirculated is temporarily increased by the increase in the sucking force of the ejector, the water can be removed from the anode (i.e., the purging of the anode is implemented by the pressure pulse and recirculation of hydrogen).

At this time, the opening time of the injector 15 can be controlled according to the pressure, the vehicle output, or the value of pressure P4. Moreover, the opening time of the injector 15 can be controlled by controlling only the rear injector 15 or by controlling both the front injector 14 and the rear injector 15.

In this case, the existing purge valve 22 need be used only during vehicle start/stop or when the concentration of nitrogen in the anode is high, and thus the amount of hydrogen discharged to the outside by the purging operation can be minimized, thereby significantly increasing fuel efficiency. Moreover, it is possible to eliminate the risk factors due to the discharge of hydrogen to the outside.

Figure 2:
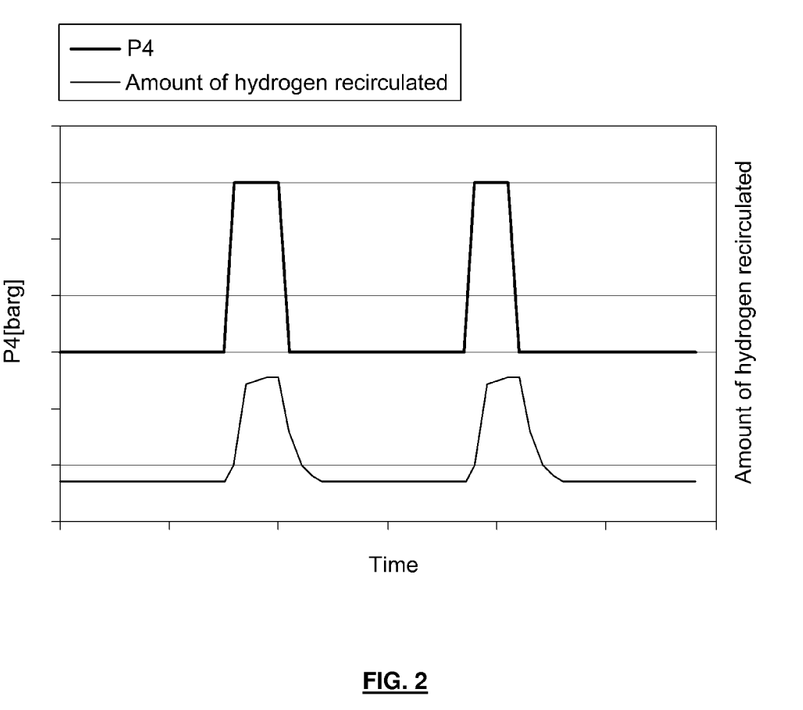
FIG. 2 is a diagram showing a change in pressure P4 and the amount of hydrogen recirculated when an injector is repeatedly opened and closed in a fuel control system in accordance with an example embodiment of the present invention.

FIG. 2 is a diagram showing a change in pressure P4 and the amount of hydrogen recirculated when the injector is repeatedly opened and closed in the fuel control system having the series-connected multi-stage pressure control structure shown in FIG. 1. When the injector 15 is temporarily opened for a predetermined period of time and closed and this operation is periodically repeated, the amount of hydrogen recirculated is temporarily increased (in the form of pulses) by the increase in the sucking force of the ejector 16, and thus the water can be efficiently removed from the anode of the fuel cell stack 20.

Figure 3:
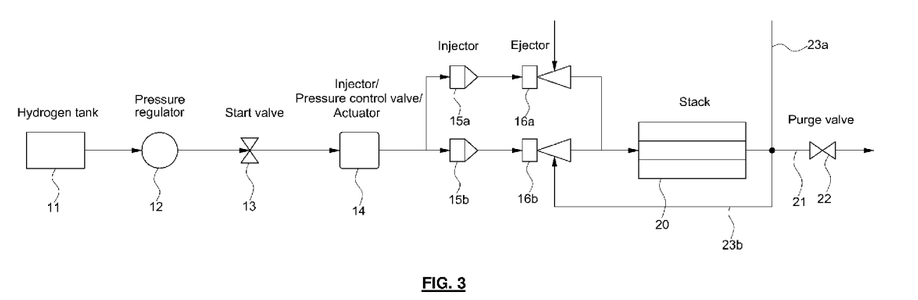
FIG. 3 is a diagram showing the configuration of a fuel control system in accordance with another example embodiment of the present invention.

FIG. 3 is a diagram showing the configuration of a fuel control system for a vehicle fuel cell system in accordance with another illustrative embodiment of the present invention, the fuel control system having a series-connected multi-stage pressure control structure in which a plurality of combinations of an injector 15 and an ejector 16, which are connected to each other in series, are connected in parallel to an injector, a pressure control valve, or a pressure control actuator 14.

According the combinations of the injector and the ejector in this embodiment of FIG. 3, the injectors 15a and 15b are provided in front of the ejectors 16a and 16b, and the ejectors 16a and 16b connected to the front of the fuel cell stack 20 are provided at the rear of the injectors 15a and 15b, and the plurality of combinations of the injector and ejector are arranged in parallel to each other.

In particular, the plurality of combinations of the injector and ejector arranged in parallel to each other are connected in series to the rear of the injector, the pressure control valve, or the pressure control actuator 14.

That is, the flow of hydrogen whose pressure is controlled by the injector, the pressure control valve, or the pressure control actuator 14 is divided into the plurality of combinations of the injectors 15a and 15b and the ejectors 16a and 16b (which are arranged in parallel to each other) disposed in series at the rear of the injector, the pressure control valve, or the pressure control actuator 14, and the divided flows of hydrogen join each other and is then supplied to the anode inlet of the fuel cell stack 20.

Here, each of the ejectors 16a and 16b is a hydrogen recirculation ejector provided in a typical fuel cell system and functions to suck the recirculation gas through recirculation lines 23a and 23b at the anode outlet and to recirculate the gas to the anode inlet.

In the embodiment of FIG. 3, the effects of the present invention, which have been described in the embodiment of FIG. 1, can be achieved in the same manner, and the injectors can be controlled by the same control method as described in the embodiment of FIG. 1.

As described above, according to the fuel control system and method for a vehicle fuel cell system of the present invention, in which the injector is additionally provided between the existing injector, the pressure control valve, or the pressure control actuator and the hydrogen recirculation ejector, it is possible to efficiently supply hydrogen to the fuel cell stack and increase the efficiency of the ejector.

Moreover, when the injector additionally disposed in front of the ejector is opened and closed in the form of pulses, it is possible to purge the anode of the fuel cell stack by the use of the ejector, and thus it is possible to minimize the number of purging operations of the anode exhaust line and reduce the amount of hydrogen discharged to the outside of the fuel cell stack, thereby increasing the fuel efficiency of the fuel cell vehicle.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fuel control system for a fuel cell system, the fuel control system comprising:
   a hydrogen supply unit;
   a fuel cell stack;
   a hydrogen supply passage, through which hydrogen is supplied from the hydrogen supply unit to the fuel cell stack;
   a first injector located along the hydrogen supply passage between the hydrogen supply unit and the fuel cell stack;
   a hydrogen recirculation ejector located along the hydrogen supply passage between the first injector and the fuel cell stack; and
   a second injector located along the hydrogen supply passage in series between the first injector and the hydrogen recirculation ejector in the hydrogen supply passage, and the second injector is periodically opened and closed to temporarily increase the amount of hydrogen recirculated through the ejector to the fuel cell stack to purge an anode of the fuel cell stack, wherein each injector is controlled such that the amount of hydrogen supplied to the ejector is maintained constant to provide a response required by a vehicle, and wherein the connection between the first injector and the second injector provides a multi-stage pressure control structure, through which hydrogen is supplied from the hydrogen supply unit to the fuel cell stack, such that the pressure of the supplied hydrogen is controlled in stages.

2. The fuel control system of claim 1, wherein the second injector and the hydrogen recirculation ejector are arranged in series in the hydrogen supply line.

3. The fuel control system of claim 2, wherein each second injector is periodically opened and closed to temporarily increase the amount of hydrogen recirculated through the ejector to the fuel cell stack, thereby purging an anode of the fuel cell stack.

4. The fuel control system of claim 1, wherein pressure of hydrogen supplied through the hydrogen supply passage is individually controlled in stages consisting of: i) a first stage between the hydrogen supply unit and the first injector, ii) a second stage between the first injector and the second injector, iii) a third stage between the second injector and the ejector, and iv) a fourth stage between the ejector and the fuel cell stack.

5. The fuel control system of claim 4, further comprising a pressure regulator within the first stage to control the pressure of hydrogen supplied in the first stage.

6. A fuel control method for a fuel cell system, the fuel control method comprising:
providing a series-connected multi-stage pressure control structure, in which a second injector is disposed in series between a first injector and a hydrogen recirculation ejector in a hydrogen supply passage, through which hydrogen is supplied from a hydrogen supply unit to a fuel cell stack, such that the pressure of hydrogen supplied is controlled in stages;
periodically opening and closing the second injector to temporarily increase the amount of hydrogen recirculated through the ejector to the fuel cell stack to purge an anode of the fuel cell stack; and
controlling each injector such that the amount of hydrogen supplied to the ejector is maintained constant to provide a response required by a vehicle.

7. The fuel control method of claim 6, further comprising:
periodically opening and closing the second injector during purging of an anode of the fuel cell stack to increase and decrease the amount of hydrogen recirculated through the ejector to the fuel cell stack in the form of pulses, thereby purging the anode of the fuel cell stack.

8. A method, comprising:
supplying hydrogen from a hydrogen supply unit to a fuel cell stack via a multi-stage hydrogen supply passage, the stages consisting in series of: i) a first stage between the hydrogen supply unit, ii) a second stage between the first injector and a second injector, iii) a third stage between the second injector and a hydrogen recirculation ejector, and iv) a fourth stage between the ejector and the fuel cell stack;
controlling a second pressure of the hydrogen in the second stage by the first injector;
controlling a third pressure of the hydrogen in the third stage by the second injector, wherein the second injector is periodically opened and closed to temporarily increase the amount of hydrogen recirculated through the ejector to the fuel cell stack to purge an anode of the fuel cell stack, and each injector is controlled such that the amount of hydrogen supply to the ejector is maintained constant to provide a response required by a vehicle; and
controlling a fourth pressure of the hydrogen in the fourth stage by the ejector.

9. The method of claim 8, further comprising:
controlling a first pressure of the hydrogen in the first stage by a pressure regulator located in the first stage.

10. The method of claim 8, wherein controlling the third pressure by the second injector is performed such that the amount of hydrogen supplied to the ejector is maintained constant.

11. The method of claim 8, wherein controlling the third pressure by the second injector is performed by periodically opening and closing the second injector to temporarily increase the amount of hydrogen recirculated through the ejector to the fuel cell stack, thereby purging an anode of the fuel cell stack.

12. The fuel cell system of claim 1, wherein the second injector and the hydrogen recirculation ejector combination are arranged in a parallel configuration with another second injector and hydrogen recirculation ejector combination, both of which in series with the first injector.

\* \* \* \* \*